May 2, 1950   J. A. MILLHEISLER   2,506,464
ADJUSTABLE FINGERSTALL
Filed Sept. 7, 1948

INVENTOR.
John A Millheisler
BY M. Y. Charles
ATTORNEY.

Patented May 2, 1950

2,506,464

UNITED STATES PATENT OFFICE 2,506,464

ADJUSTABLE FINGERSTALL

John A. Millheisler, Coeur d'Alene, Idaho

Application September 7, 1948, Serial No. 48,098

4 Claims. (Cl. 128—77)

My invention relates to an improvement in adjustable finger stalls. The object of this stall is to provide a device that may be used as a finger stall or a protector for injured fingers and in many cases the device will serve very satisfactorily as a splint for broken fingers or fingers which have been badly sprained and the like.

A further object of this invention is to provide a finger stall of the kind mentioned that is made of a malleable material so that the stall can be readily bent and formed to fit any size finger and this can be done in most all instances without the use of tools.

Another object of the invention is to provide a device of the kind mentioned in which the legs of the device are curved transversely so as to stiffen the legs and also to impart a curved inner surface to that portion of the finger stall embodied in the width of the legs of the stall. The object of this curve is to provide a stall of the kind mentioned that will fit closely around the injured finger and will not build up more bulk in the finger dressing than is necessary.

A still further object of the invention is to provide a finger stall of the kind mentioned, the legs of which can be rotated toward and away from each other so as to provide supports for the injured finger at the most advantageous points around the finger.

Another object of the invention is to provide a finger stall of the kind mentioned, the legs of which are transversely scored at spaced intervals along the leg so that the legs may be sharply bent at any one of the scoring marks and thereby be broken off at any desired point along the leg so as to obtain the proper or desired length of leg.

Another object of the invention is to provide a finger stall of the kind mentioned in which the leg elements of the stall are provided with extensible slide elements whereby the slide elements may be slid on the leg elements to increase the length of the leg element if desired or to serve as a reinforcement for the leg element, and to make the leg element more rigid if desired, so it can be used as a splint to hold the finger in a definite fixed position.

A still further object of the invention is to provide a device of the kind mentioned in which provision is made for holding the slide extensions in any adjusted position on the leg element of the device.

A still further object of the invention is to provide a device of the kind mentioned that is simple in construction, simple and easy to make, one that is durable and long lived as well as one that is inexpensive to make and buy. These and other objects will be more fully explained as this description progresses.

Now referring to the accompanying drawings in which similar numerals of reference designate the same parts throughout the several figures of the drawings.

Figure 3:
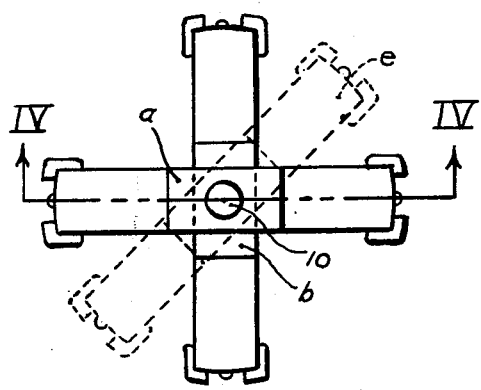
Fig. 3 is a top plan view of the device as shown in Fig. 1.
Figure 5:
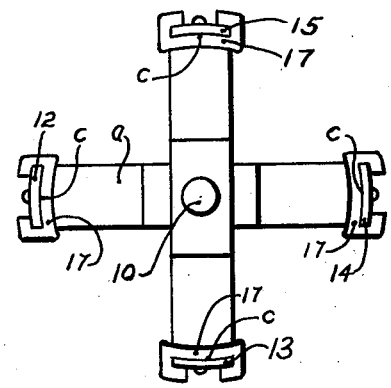
Fig. 5 is a bottom plan view of the device as shown in Fig. 1.
Figure 1:
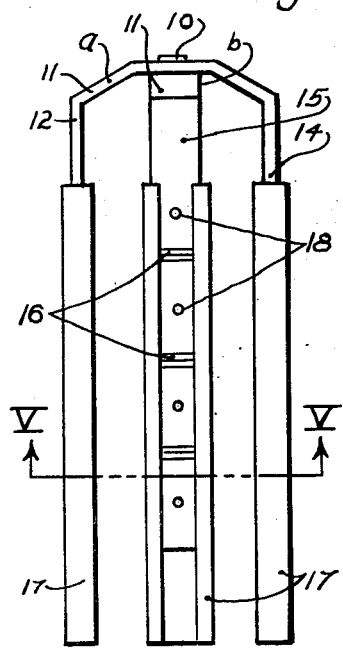
Fig. 1 is a side view of the preferred form of the device.

In the drawings the device is shown as consisting of two strips of malleable material $a$ and $b$ that are fastened together at their central portion by means of a rivet 10 about which the pieces $a$ and $b$ may be revolved in or out of registry with each other for purposes that will later be explained. The pieces $a$ and $b$ may be turned cross ways, or out of registry with each other and then bent in a downwardly sloping direction, either in a curved or sharp bend as indicated at 11 and the balance of the ends of each strip $a$ and $b$ may then be bent downwardly so that the cross portions of the strips $a$ and $b$ will form a protection for the end of the finger and the substantially parallel and downwardly extending portions of the strips $a$ and $b$ will form the legs 12, 13, 14 and 15 of the finger stall.

The legs 12, 13, 14 and 15 are curved transversely as indicated at $c$ so as to establish or outline a curved formation in which the injured finger or finger and dressing may be snugly received. In placing the device on an injured finger the strips $a$ and $b$ may be revolved about the rivet 10 to positions such as indicated by the dotted lines $e$ so as to place the legs of the finger stall at the points of most advantage about the injured finger.

Figure 6:
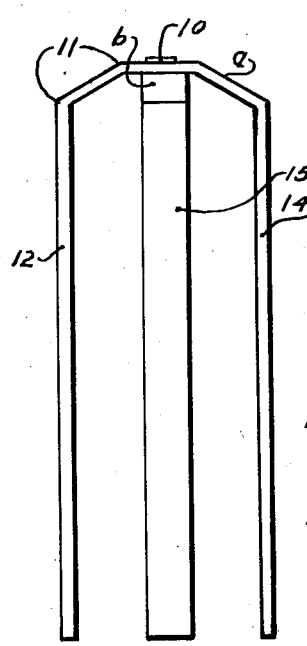
Fig. 6 is a side view of a modified and simplified form of the device.
Figure 2:
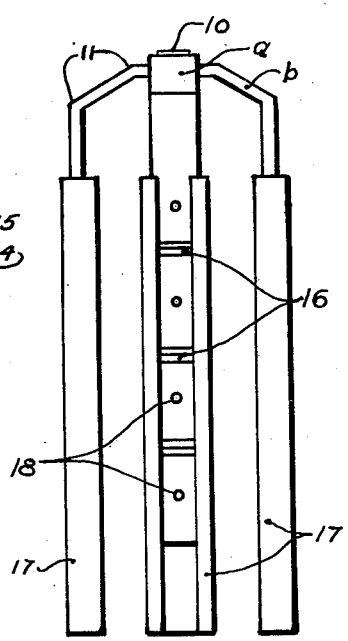
Fig. 2 is also a side view of the preferred form of the device, the view being as seen at an angle of 90 degrees from that shown in Fig. 1.
Figure 4:
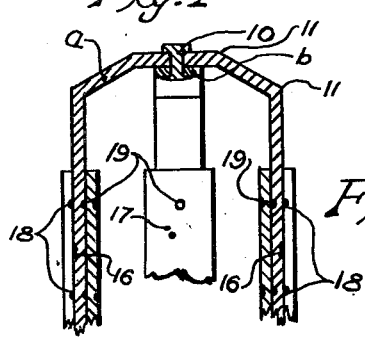
Fig. 4 is a detail sectional view through the device, the view being as seen from the line IV—IV in Fig. 3 and looking in the direction of the arrows.

The device thus far described is the more simple form of the device as shown in Fig. 6 and to this device as shown in Fig. 6 may be added the following described features and attachments to make a more broadly usable outfit of the device.

To accomplish this, the legs 12, 13, 14 and 15 of the device are transversely scored as indicated at 16 so that the legs may be sharply bent and broken off at any one of the scorings 16 to shorten a leg if a short leg is more desirable for use than a long one.

The utility of the device may be further increased by the addition of slide elements 17 that are fashioned to fit against the inside curve of the legs 12, 13, 14 and 15 and the side edges of the slides 17 are rolled over the side edges of the legs 12, 13, 14 and 15 so that the slides 17 will be slidably retained on the legs 12, 13, 14 and 15.

The legs 12, 13, 14 and 15 are provided with a plurality of indentures 18 and the metal of the indented portion projects to the outside of the leg. The upper end of each slide 17 is provided with an indenture 19 and the metal carrying the indenture 19 projects from the slide 17 so as to be received in any one of the indentures 18 of their respective leg 12, 13, 14 or 15.

This serves as a stationing means for the slides 17 in any of their adjusted positions on their respective leg 12, 13, 14 or 15. Now by sliding the slide 17 up or down on their respective leg element the metal of the indenture 19 will spring the leg or the leg and the slide so that the indenture 19 may be moved into any selected indenture 17 so as to hold the slide 17 in any adjusted or extended position on its respective leg 12, 13, 14 or 15. The slide 17 also serves as a stiffening means for the legs 12, 13, 14 and 15 whereby these legs due to their stiffness may be used as a splint for broken bones or sprained fingers and the like.

While this device as shown and described is probably the preferred form of the device it is to be understood that such modifications of the invention may be employed as lie within the scope of the appended claims without departing from the spirit of the invention. Now having fully shown and described my invention, what I claim is:

1. In a finger stall device of the kind described; said device comprising a plurality of strips of malleable material, said strips being pivotally held together, one upon the other at their central portions, said strips being pivotally turnable out of registry with each other and the ends of said strips being turned in the same direction to form U-shaped elements having substantially parallelly positioned legs that are pivotally adjustably positionable around an injured member, said leg elements being curved transversely to provide stiffness to the leg and to provide a formed curvature in the stall for close fitting around the injured member.

2. In a finger stall device of the kind described; said device comprising a plurality of strips of malleable material, said strips being pivotally held together, one upon the other at their central portions, said strips being turnable out of registry with each other and the ends of said strips being turned in the same direction to form U-shaped elements having substantially parallelly positioned legs that are adjustably positionable around an injured member, said leg elements being curved transversely to provide stiffness to the leg and to provide a curvature in the stall for close fitting around the injured member, said legs having transverse and spaced apart scorings therein upon which bends may be made to sever and shorten the leg.

3. In a finger stall device of the kind described; said device comprising a plurality of strips of malleable material, said strips being pivotally held together, one upon the other at their central portions, said strips being turnable out of registry with each other and the ends of said strips being turned in the same direction to form U-shaped elements having substantially parallelly positioned legs that are adjustably positionable around an injured member, said leg elements being curved transversely to provide stiffness to the leg and to provide a curvature in the stall for close fitting around the injured member, said legs having transverse and spaced apart scorings therein upon which bends may be made to sever and shorten the leg, said leg elements having long slide elements thereon, said slide elements being curved transversely to snugly fit the curve of the legs, and means for stationing said slides in adjusted positions on said legs.

4. In a finger stall device of the kind described, the structure defined in claim 3, said slide stationing means comprising registerable indentures in said leg and slide.

JOHN A. MILLHEISLER.

REFERENCES CITED

The following references are of record in the file of this patent:

UNITED STATES PATENTS

| Number | Name | Date |
|---|---|---|
| 1,144,103 | Brant | June 22, 1915 |